(12) United States Patent
Arikawa et al.

(10) Patent No.: US 6,708,383 B2
(45) Date of Patent: Mar. 23, 2004

(54) METHOD FOR SETTING FREE-STATE DIAMETER OF METAL RING

(75) Inventors: Mamoru Arikawa, Saitama (JP); Shigeru Kanehara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/272,287

(22) Filed: Oct. 17, 2002

(65) Prior Publication Data

US 2003/0084729 A1 May 8, 2003

(30) Foreign Application Priority Data

Oct. 19, 2001 (JP) ......................................... 2001-321637

(51) Int. Cl.$^7$ .......................... B23Q 17/00; G01M 19/00
(52) U.S. Cl. ............................ 29/407.05; 29/407.08; 29/446; 474/242
(58) Field of Search .................... 29/407.05, 407.08, 29/446, 450; 474/242; 73/862.453

(56) References Cited

U.S. PATENT DOCUMENTS

| | | | | |
|---|---|---|---|---|
| 4,832,671 A | * | 5/1989 | Satoh | 474/242 |
| 5,877,431 A | * | 3/1999 | Hirano | 73/862.41 |
| 6,123,637 A | * | 9/2000 | Yagasaki | 474/242 |
| 6,217,472 B1 | * | 4/2001 | Fujioka et al. | 474/242 |
| 6,273,837 B1 | * | 8/2001 | Yoshida et al. | 474/242 |
| 6,318,140 B1 | * | 11/2001 | Yamagishi et al. | 72/110 |
| 6,432,012 B1 | * | 8/2002 | Kanehara et al. | 474/242 |
| 6,482,117 B1 | * | 11/2002 | Kanehara et al. | 474/242 |
| 6,562,153 B1 | * | 5/2003 | Uehara et al. | 148/325 |
| 6,578,249 B2 | * | 6/2003 | Fujioka | 29/434 |
| 2002/0019283 A1 | * | 2/2002 | Mitsubayashi et al. | 474/272 |

FOREIGN PATENT DOCUMENTS

| | | | | |
|---|---|---|---|---|
| EP | 1304502 A2 | * | 4/2003 | F16G/5/16 |
| EP | 1304503 A2 | * | 4/2003 | F16G/5/16 |
| JP | 63-203945 | | 8/1988 | |
| JP | 7-110390 | | 11/1995 | |
| JP | 2003049905a | * | 2/2003 | F16G/1/28 |

* cited by examiner

Primary Examiner—Peter Vo
Assistant Examiner—Essama Omgba
(74) Attorney, Agent, or Firm—Arent Fox Kintner Plotkin & Kahn PLLC

(57) ABSTRACT

A free-state diameter, upon cutting each metal ring, is set so that when the ratio of a continuously variable transmission is a value in a TOP state and a metal ring receives a severe load, a corrected amplitude of a stress on an outer peripheral surface of the metal ring calculated from an amplitude and a middle value of the stress on the outer peripheral surface of the metal ring is equal to a corrected amplitude of a stress on an inner peripheral surface of the metal ring calculated from an amplitude and a middle value of the stress on the inner peripheral surface of the metal ring. Therefore, an appropriate free-state diameter is set in consideration of a stress based on a tensile load of the metal ring and a stress based on the bending load of the metal ring.

8 Claims, 10 Drawing Sheets

FIG. 6B SERVICE STATE

FIG. 6A NON-SERVICE STATE

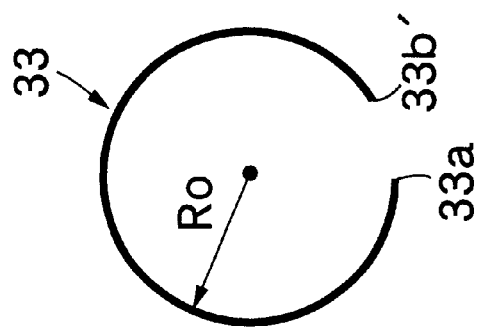
FIG.10A ENDLESS STATE
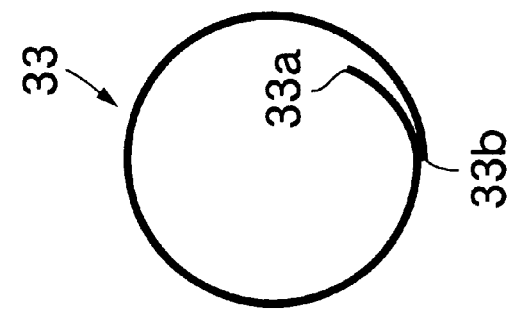
FIG.10B FREE STATE (CUT AT ONE POINT)
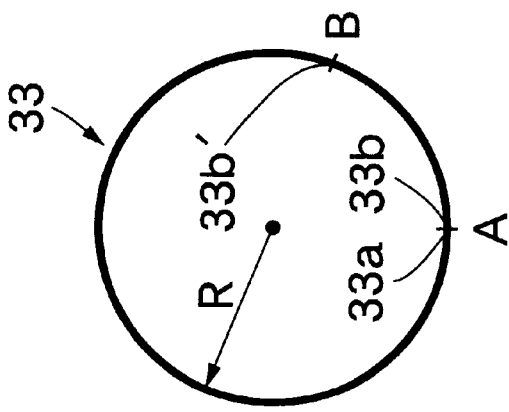
FIG.10C FREE STATE (CUT AT TWO POINT)

US 6,708,383 B2

METHOD FOR SETTING FREE-STATE DIAMETER OF METAL RING

BACKGROUND OF THE INVENTION

1. Field of the Invention

The present invention relates to a method for setting a free-state diameter of a metal ring of a metal belt for a continuously variable transmission upon cutting of the metal ring at a predetermined value in order to apply a residual stress to increase the fatigue life of the metal ring.

2. Description of the Related Art

A metal belt used in a continuously variable transmission typically includes a plurality of metal elements mounted on metal ring assemblies, each metal ring assembly having a plurality of metal rings laminated on one another. Accordingly, a driving force is transmitted by a pushing force between the metal elements, which are in contact with one another, in a state in which the metal belt has been reeved around a driving pulley and a driven pulley. A stress applied to each of the metal rings supporting the metal elements in the metal belt is varied periodically during traveling of the metal belt along the driving pulley and the driven pulley. Moreover, the applied stress is different between an inner peripheral surface and an outer peripheral surface of the metal ring. If the stress applied to the inner peripheral surface of the metal ring and the stress applied to the outer peripheral surface are not uniform, a face of the metal ring which receives a large stress fatigues early, which causes a reduction in the overall fatigue life of the overall metal ring assembly.

Conventional metal belts are disclosed in Japanese Patent Application Laid-open No. 63-20945 and Japanese Patent Publication No. 7-110390, wherein a residual stress is pre-applied to each metal ring so the stresses applied to the inner and outer peripheral surfaces of the metal ring are as uniform as possible. Thus, any stress generated by operation of the metal belt is countervailed by the residual stress and the fatigue life of the metal ring is prolonged.

The largest stress on the metal ring during operation of the continuously variable transmission varies in accordance with the free-state diameter of the metal ring. The term "free-state diameter of the metal ring" is defined as a diameter of the metal ring measured in a free state of the metal ring in which a sum total of moments generated by the residual stress upon cutting of the metal ring is zero. The metal ring is manufactured such that when the free-state diameter is increased, the largest stress on the outer peripheral surface of the metal ring increases, while the largest stress on the inner peripheral surface decreases. In the above-described conventional metal belt, a peak value of the largest stress on the metal ring is suppressed to a lower value to prolong the fatigue life by setting the free-state diameter such that the largest stresses on the outer and inner peripheral surfaces are equal to each other.

In the above-described conventional metal ring, however, the largest stress on the metal ring is calculated based on a bending stress at a portion where the metal belt is wound on the pulley, and a stress based on the tension of the metal belt is not taken into consideration. Accordingly, the correlation between the free-state diameter and the fatigue life of the metal ring is unsatisfactory.

SUMMARY OF THE INVENTION

It is an object of the present invention to overcome the above-described drawbacks of the conventional metal belts.

It is also an object of the present invention to set a free-state diameter enough to maximize the fatigue life of each metal ring of the continuously variable transmission.

To achieve the above objects, there is provided a method for setting a free-state diameter of each metal ring of a metal belt of a continuously variable transmission, upon cutting of the metal ring at a predetermined value that depends on a residual stress for increasing a fatigue life of the metal ring in order to apply the residual stress to the metal ring. The method includes the step of calculating variations in the stresses on the inner and outer peripheral surfaces of the metal ring during operation of the continuously variable transmission. An amplitude and a middle value of the stress on the outer peripheral surface of the metal ring is then calculated. A corrected amplitude of the stress on the outer peripheral surface from the amplitude and the middle value of the stress on the outer peripheral surface is then calculated. An amplitude and a middle value of the stress on the inner peripheral surface of the metal ring is calculated. A corrected amplitude of the stress on the inner peripheral surface from the amplitude and the middle value of the stress on the inner peripheral surface is calculated. A free-state diameter is set based on the corrected amplitude of the stress on the outer peripheral surface and the corrected amplitude of the stress on the inner peripheral surface.

With the above configuration, the free-state diameter, upon cutting of the metal ring, is set based on the corrected amplitude of the stress on the outer peripheral surface, which is calculated from the amplitude and the middle value of the stress on the outer peripheral surface of the metal ring and the corrected amplitude of the stress on the inner peripheral surface, which is calculated from the amplitude and the middle value of the stress on the inner peripheral surface of the metal ring. Therefore, an appropriate free-state diameter can be set in consideration of a stress based on a tensile load of the metal ring and a stress based on a bending load of the metal ring, wherein the life of the metal ring is effectively prolonged.

Alternatively, the free-state diameter can be set so the corrected amplitude of the stress on the outer peripheral surface of the metal ring and the corrected amplitude of the stress on the inner peripheral surface are equal to each other.

With the above configuration, the free-state diameter is set so the corrected amplitudes of the stresses on the outer and inner peripheral surfaces of the metal ring are equal to each other. As a result, the fatigue lives of the outer and inner peripheral surfaces are uniform, wherein the life of the metal ring is prolonged even further.

The free-state diameter may also be set based on the corrected amplitude of the stress on the outer peripheral surface of the metal ring and the corrected amplitude of the stress on the inner peripheral surface in a TOP-ratio state of the continuously variable transmission.

With the above configuration, the free-state diameter is set based on the corrected amplitudes of the stresses on the outer and inner peripheral surfaces of the metal ring in the TOP-ratio state of the continuously variable transmission. Therefore, it is possible to prolong the life of the metal ring at the time when the metal ring is in a most severe operational state.

A region between the free-state diameter at which the corrected amplitudes of the stresses on the outer and inner peripheral surfaces of the metal ring in the TOP-ratio state of the continuously variable transmission are equal to each other and the free-state diameter at which the corrected amplitudes of the stresses on the outer and inner peripheral surfaces of the metal ring in an OD-ratio state of the continuously variable transmission are equal to each other is established as a region where the free-state diameter is appropriate.

With the above configuration, the region between the free-state diameter at which the corrected amplitudes of the stresses on the outer and inner peripheral surfaces of the metal ring in the TOP-ratio state are equal to each other and the free-state diameter at which the corrected amplitudes of the stresses on the outer and inner peripheral surfaces of the metal ring in an OD-ratio state is established as the region where the frees-state diameter is appropriate. Therefore, the life of the metal ring is effectively prolonged in the region from the TOP state in which the load of the metal ring is largest to the OD state in which the service frequency is highest.

Alternatively, in a region between the free-state diameter at which the corrected amplitudes of the stresses on the outer and inner peripheral surfaces of the metal ring in a TOP-ratio state of the continuously variable transmission are equal to each other and the free-state diameter at which the corrected amplitude of the stress on the inner peripheral surface of the metal ring equal to the corrected amplitude of the stress on the outer peripheral surface of the metal ring in a state in which the ratio of the continuously variable transmission at the above-described free-state diameter assumes a value in the OD state is generated in the TOP-ratio state of the continuously variable transmission is established as the region where the free-state diameter is appropriate.

With the above configuration, the region between the free-state diameter at which the corrected amplitudes of the stresses on the outer and inner peripheral surfaces of the metal ring in the TOP-ratio state are equal to each other and the free-state diameter at which the corrected amplitude of the stress on the inner peripheral surface of the metal ring equal to the corrected amplitude of the stress on the outer peripheral surface of the metal ring in a state in which the ratio of the continuously variable transmission at the above-described free-state diameter corresponds to the OD state is generated in the TOP-ratio state, is established as the region where the free-state diameter is appropriate. Therefore, the upper limit of the corrected amplitude of the stress can be suppressed to a predetermined value of less in the region from the TOP state in which the load of the metal ring is largest and the OD state in which the service frequency is highest, wherein the life of the metal ring is effectively prolonged.

The above and other objects, features and advantages of the present invention will become apparent from the following description of the preferred embodiment taken in conjunction with the accompanying drawings.

BRIEF DESCRIPTION OF THE DRAWINGS

FIGS. 10A, 10B and 10C are diagrams explaining a technique used for measuring the free-state diameter of the metal ring.

DESCRIPTION OF THE PREFERRED EMBODIMENT

The present invention will now be described by way of an embodiment with reference to the accompanying drawings.

Figure 1:
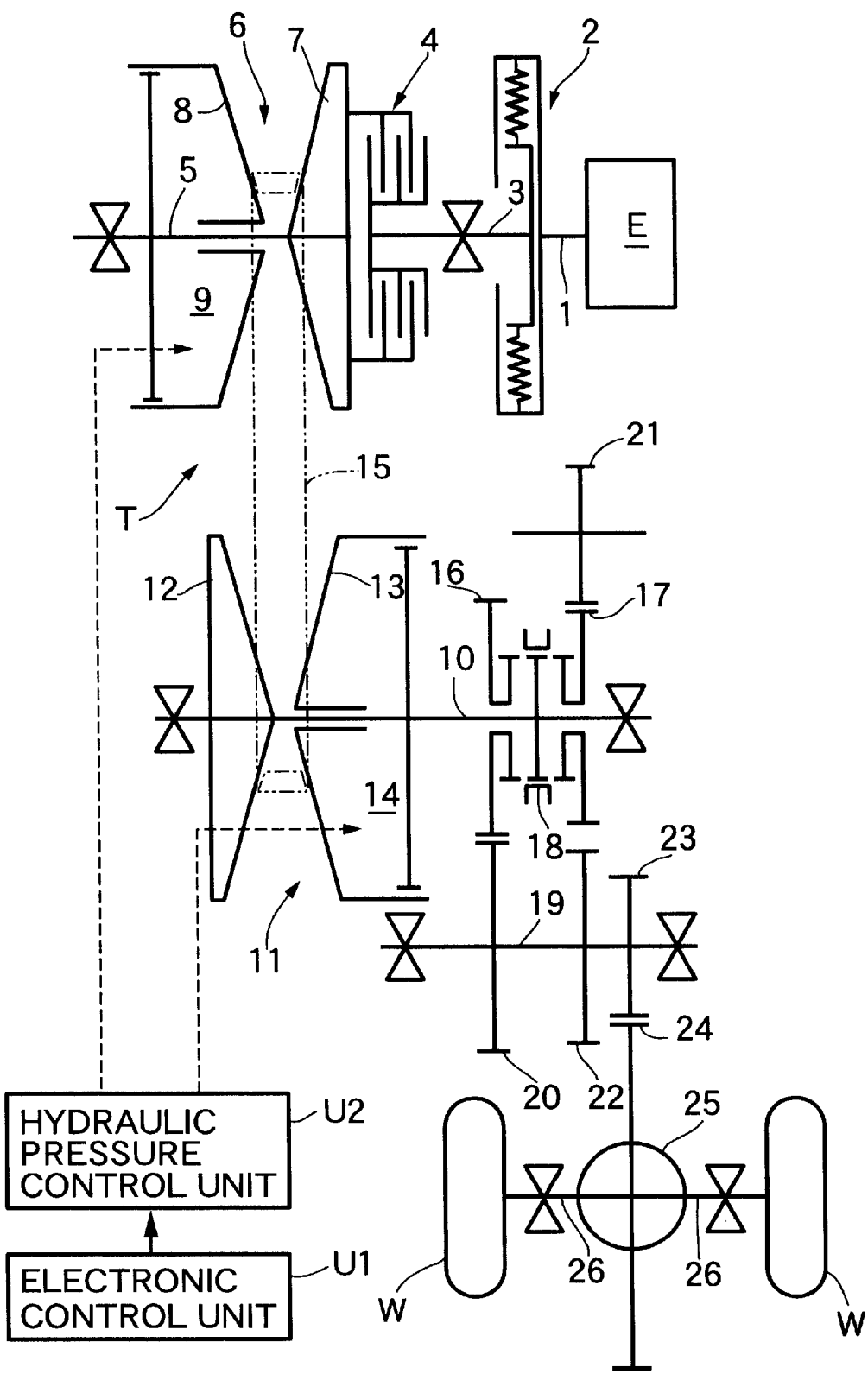
FIG. 1 is a schematic diagram of a power-transmitting system of a vehicle having a belt-type continuously variable transmission mounted thereon.

FIG. 1 is a schematic diagram showing a metal belt-type continuously variable transmission T mounted on an automobile. An input shaft 3 connected to a crankshaft 1 of an engine E through a damper 2 is connected to a driving shaft 5 of the metal belt-type continuously variable transmission T through a starting clutch 4. A driving pulley 6 mounted on the driving shaft 5 includes a stationary pulley half 7 secured to the driving shaft 5, and a movable pulley half 8 that can be moved toward and away from the stationary pulley half 7. The movable pulley half 8 is biased toward the stationary pulley half 7 by a hydraulic pressure applied to an oil chamber 9.

Figure 2:
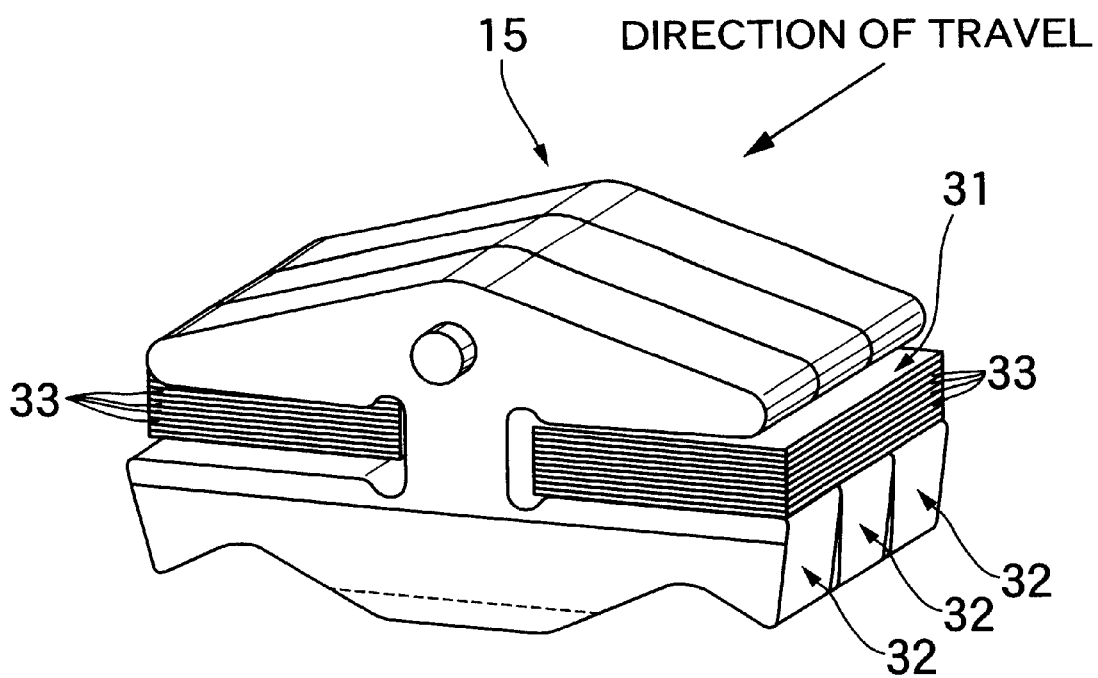
FIG. 2 is a perspective view of a portion of a metal belt.

A driven shaft 11 mounted on a driven shaft 10 disposed in parallel to the driving shaft 5 includes a stationary pulley half 12 secured to the driven shaft 10, and a movable pulley half 13 that can be moved toward and away from the stationary pulley half 12. The movable pulley half 13 is biased toward the stationary pulley half 12 by a hydraulic pressure applied to an oil chamber 14. A metal belt 15 including a relatively large number of metal elements 32 supported on a pair of left and right metal ring assemblies 31, 31 is reeved between the driving pulley 6 and the driven pulley 11 (FIG. 2). Each of the metal ring assemblies 31, 31 includes 12 metal rings laminated on one another.

A forward driving gear 16 and a backward driving gear 17 are relatively rotatably carried on the driven shaft 10 and capable of being selectively coupled to the driven shaft 10 by a selector 18. A forward driven gear 20 meshed with the forward driving gear 16 and a backward driven gear 22 meshed with the backward driving gear 17 through a backward idling gear 21 are secured to an output shaft 19 disposed in parallel to the driven shaft 10.

The rotation of the output shaft 19 is input to a differential gear 25 through a final driving gear 23 and a final driven gear 24 and transmitted therefrom through left and right axles 26, 26 to driven wheels W, W.

Thus, a driving force of the engine E is transmitted to the driven shaft 10 through the crankshaft 1, the damper 2, the input shaft 3, the starting clutch 4, the driving shaft 5, the driving pulley 6, the metal belt 15 and the driven pulley 11. When a forward traveling range is selected, a driving force of the driven shaft 10 is transmitted to the output shaft 19 through the forward driving gear 16 and the forward driven gear 20 to allow a vehicle to travel forwards. When a backward traveling range is selected, a driving force of the driven shaft 10 is transmitted to the output shaft 19 through the backward driving gear 17, the backward idling gear 21 and the backward driven gear 22 to allow the vehicle to travel backwards.

At this time, hydraulic pressures applied to the oil chamber 9 in the driving pulley 6 and the oil chamber 14 in the driven pulley 11 in the metal belt-type continuously variable transmission T are controlled by a hydraulic pressure control unit U2 operated by a command from an electronic control unit U1, wherein the ratio of the continuously variable transmission T is regulated continuously or in a stepless manner. More specifically, if the hydraulic pressure applied to the oil chamber 14 in the driven pulley 11 is increased relative to the hydraulic pressure applied to the oil chamber 9 in the driving pulley 6, the groove width of the driven pulley 11 is decreased, leading to an increase in effective radius. Accordingly, the groove width of the driving pulley 6 is increased, leading to a decrease in effective radius. Therefore, the ratio of the metal belt-type continuously variable transmission T is changed continuously toward LOW, that is, a state having the largest ratio. On the other hand, if the hydraulic pressure applied to the oil chamber 9 in the driving pulley 6 is increased relative to the hydraulic pressure applied to the oil chamber 14 in the driven pulley 11, the groove width of the driving pulley 6 is decreased, leading to an increase in effective radius. Accordingly, the groove width of the driven pulley 11 is increased, leading to a decrease in effective radius. Therefore, the ratio of the metal belt-type continuously variable transmission T is changed continuously toward OD, that is, a state having the smallest ratio.

Figure 3:
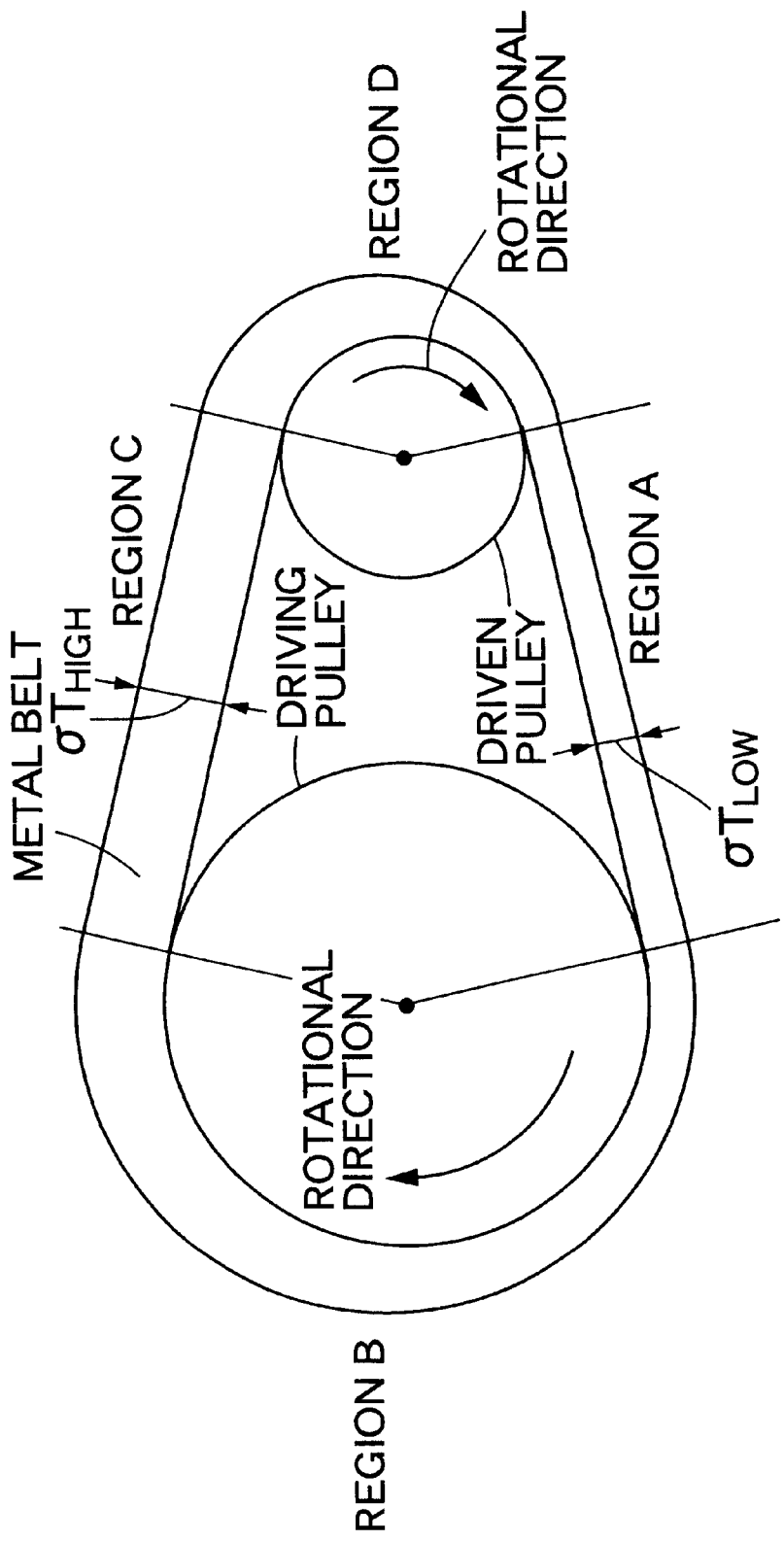
FIG. 3 is a diagram explaining application of a tensile stress to a metal ring.

FIG. 3 shows a state in which the vehicle is in a state of travel at a highest speed, that is, a state having a TOP ratio, wherein the effective radius of the driving pulley 6 is larger than that of the driven pulley 11. The thickness of the metal belt 15 in FIG. 3 schematically represents the magnitude of a tensile stress on each metal ring 33 due to the tension of the metal belt 15. As shown by dashed lines in FIGS. 4 and 5, in a return-side chord section, that is region A, where the metal belt 15 is returned from the driven pulley 11 to the driving pulley 6, the tensile stress is a constant value $\sigma T_{LOW}$. In an advance-side chord section, that is region C, where the metal belt 15 is delivered from the driving pulley 6 to the driven pulley 11, the tensile stress is a constant value $\sigma T_{HIGH}$. The stress $\sigma T_{LOW}$ in the region A is smaller than the stress $\sigma T_{HIGH}$ in the region C. In a section, that is region B, where the metal belt 15 is wound onto the driving pulley 6, the stress from an entrance side to an exit side is increased from $\sigma T_{LOW}$ to $\sigma T_{HIGH}$. In a section, that is region D, where the metal belt 15 is wound onto the driven pulley 11, the stress from an entrance side to an exist side is decreased from $\sigma T_{HIGH}$ to $\sigma T_{LOW}$.

The tensile stress on the metal ring 33 based on the tension of the metal belt 15 is constant in a widthwise direction of the metal ring 33. More specifically, as shown by the dashed lines in FIGS. 4 and 5, the tensile stresses on an inner peripheral surface and an outer peripheral surface of the metal ring 33 are equal to each other.

Figure 6:
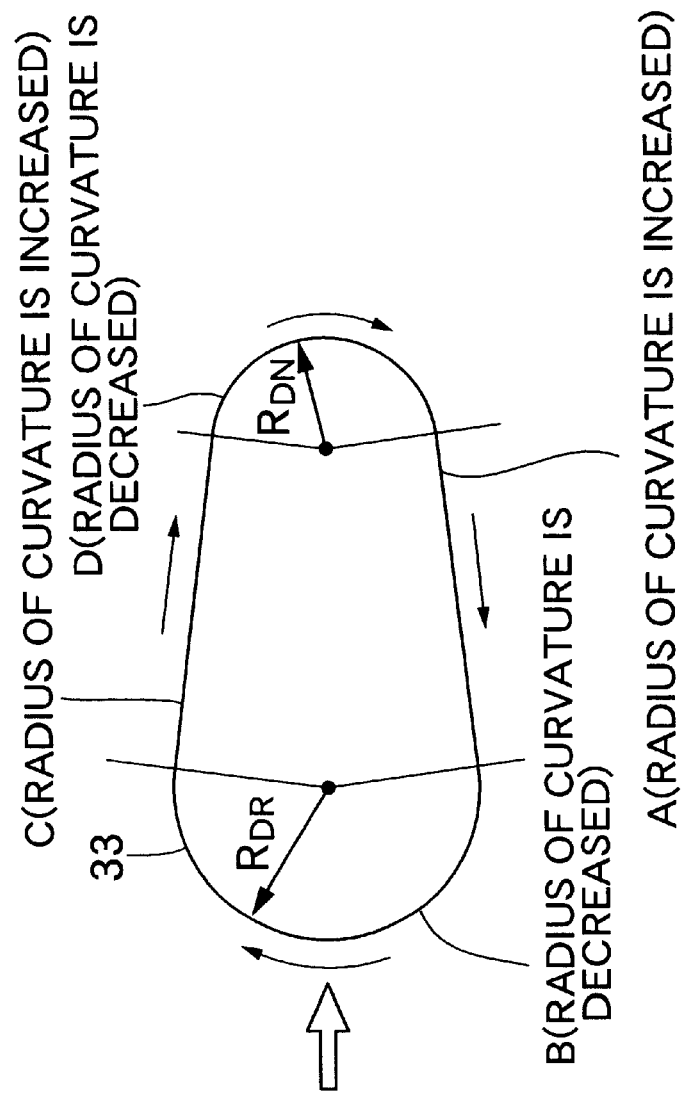
FIGS. 6A and 6B are diagrams showing shapes of the metal ring in a non-service or endless state and a service state.

In addition to the tensile stress based on the tension, a tensile stress and a compression stress based on the bending of the metal ring 33 are applied to the metal ring 33. As shown in FIG. 6A, the metal ring 33 is circular in a non-service state in which no external force is applied. However, as shown in FIG. 6B, the metal ring in a service state is deformed into a shape having the regions A to D. In the return-side chord section, that is, the region A, and the advance-side section, that is, the region C, the radius of curvature assuming R in the non-service state is infinitely increased. In the region B, where the metal belt 15 is wound onto the larger-diameter driving pulley 6, the radius of curvature assuming R in the non-service state is decreased to $R_{DR}$. In the region D, where the metal belt 15 is wound onto the smaller-diameter driven pulley 11, the radius of curvature assuming R in the non-service state is decreased to $R_{DN}$.

As such, in regions A and C, where the radius of curvature of the metal ring 33 is increased, a tensile bending stress $\sigma V_{ST}$ is applied to the inner peripheral surface of the metal ring 33, and a compression bending stress $\sigma V_{ST}$ is applied to the outer peripheral surface. In regions B and D, where the radius of curvature of the metal ring 33 is decreased, a tensile bending stress $\sigma V_{DR}$, $\sigma V_{DN}$ is applied to the inner peripheral surface of the metal ring 33, and a compression bending stress $\sigma V_{DR}$, $\sigma V_{DN}$ is applied to the outer peripheral surface.

Figure 4:
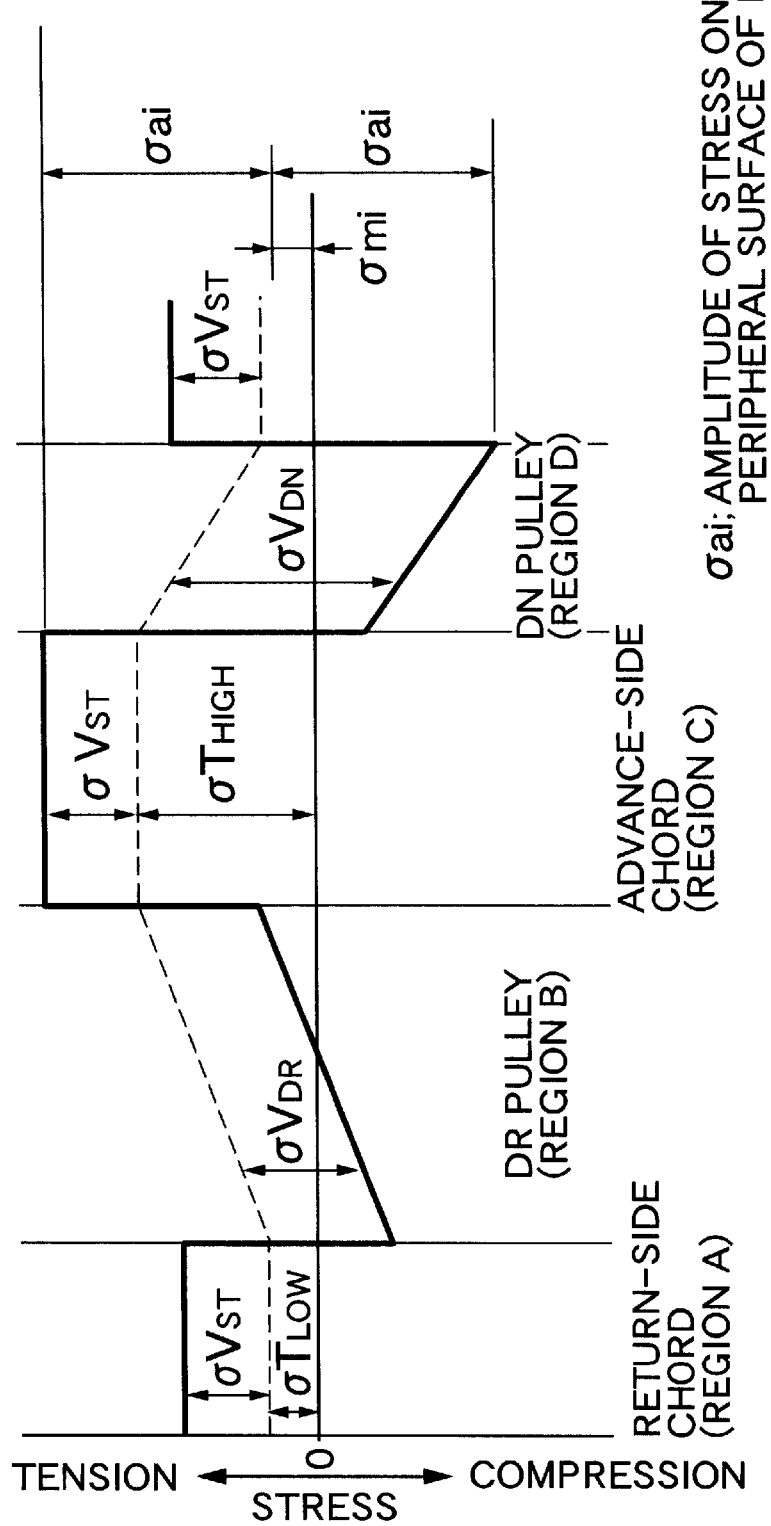
FIG. 4 is a graph showing a variation in stress applied to an inner peripheral surface of the metal ring.
Figure 5:
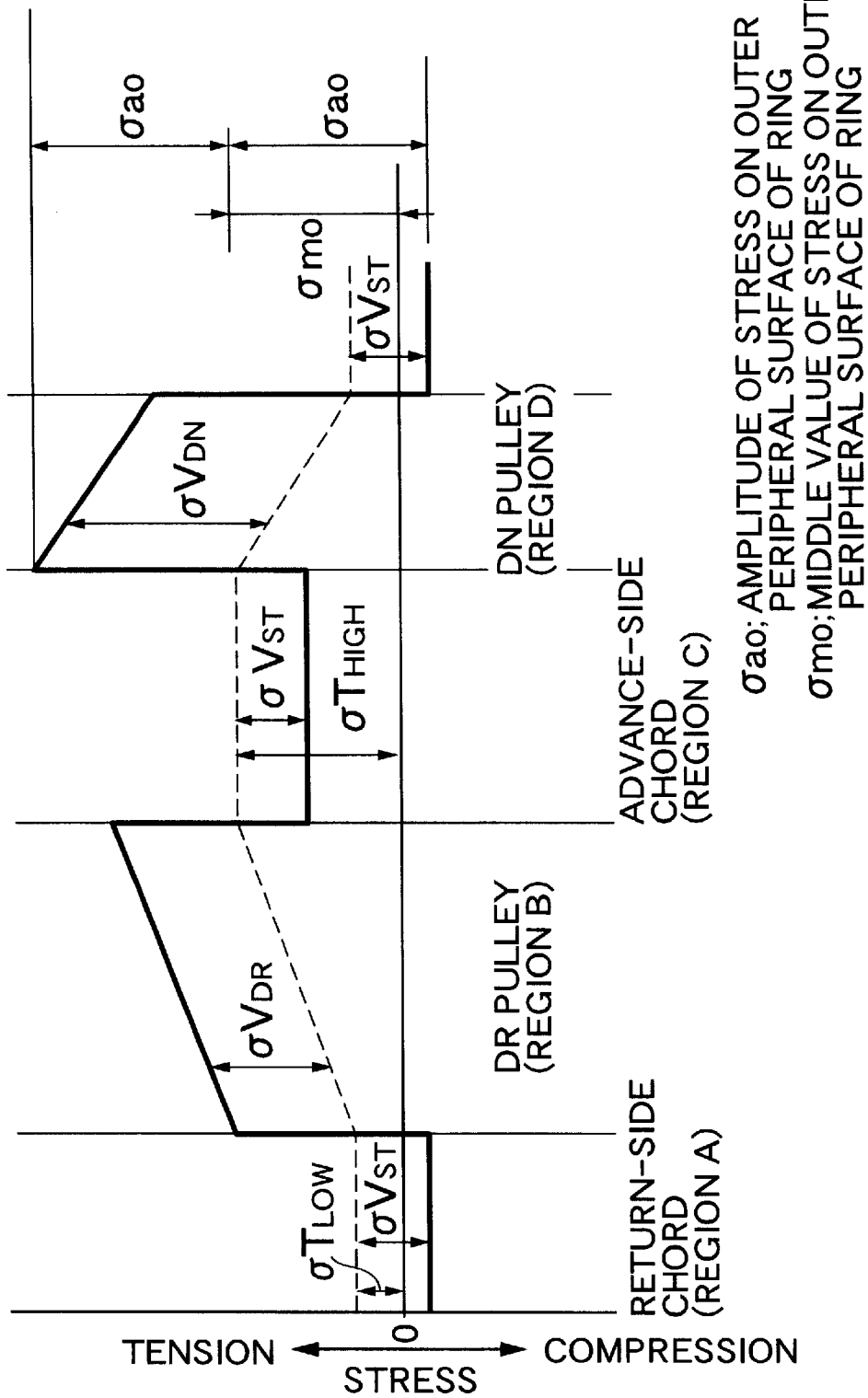
FIG. 5 is a graph showing a variation in stress applied to an outer peripheral surface of the metal ring.

Also shown in the graphs of FIGS. 4 and 5 are variations in the bending stresses applied to the inner peripheral surface and the outer peripheral surface of the metal ring 33 when the vehicle is in the highest-speed travel state illustrated in FIG. 3. As shown in FIG. 4, a constant tensile bending stress $\sigma V_{ST}$ is applied to the inner peripheral surface of the metal ring 33 in the two chord sections, that is, regions A and C. In region B, where the metal belt 15 is wound onto the driving pulley having the larger radius of curvature, a relatively small compression bending stress $\sigma V_{DR}$ is applied to the inner peripheral surface of the metal ring 33. Also, in region D, where the metal belt 15 is wound onto the driven pulley having the smaller radius of curvature, a relatively large compression bending stress $\sigma V_{DN}$ is applied to the inner peripheral surface of the metal ring 33. On the other hand, as shown in FIG. 5, a constant compression bending stress $\sigma V_{ST}$ is applied to the outer peripheral surface of the metal ring 33 in the two chord sections, that is, regions A and C. In region B, where the metal belt 15 is wound onto the driving pulley having the larger radius of curvature, a relatively small tensile bending stress $\sigma V_{DR}$ is applied to the outer peripheral surface of the metal ring 33. In region D, where the metal belt 15 is wound onto the driven pulley having the smaller radius of curvature, a relatively large tensile bending stress $\sigma V_{DN}$ is applied to the outer peripheral surface of the metal ring 33.

At this time, by pre-applying a residual stress in an opposite direction to the inner and outer peripheral surfaces of the metal ring 33, the bending stresses $\sigma V_{ST}$, $\sigma V_{DR}$ and $\sigma V_{DN}$ generated on the inner peripheral surface and the outer peripheral surface of the metal ring 33, can be increased or decreased by the residual stress. As such, variations in bending stresses shown in the graphs of FIGS. 4 and 5 can be regulated. Any means, such as shot pinning, rolling, thermal treatment, and the like may be used for applying the compression residual stress to the metal ring 33.

A solid line in FIG. 4 indicates a variation in total stress, which results from the addition of the stresses $\sigma T_{LOW}$ and $\sigma T_{HIGH}$, applied based on the tension of the metal ring 33, and the stresses $\sigma V_{DR}$ and $\sigma V_{DN}$, applied to the inner peripheral surface of the metal ring 33 based on the bending of the metal ring 33 and which is applied to the inner peripheral surface of the metal ring 33. A solid line in FIG. 5 indicates a variation in total stress, which results from the addition of the stresses $\sigma T_{LOW}$ and $\sigma T_{HIGH}$, applied based on the tension of the metal ring 33, and the stresses $\sigma V_{DR}$ and $\sigma_{DN}$, applied to the outer peripheral surface of the metal ring 33 based on the bending of the metal ring 33 and which is applied to the outer peripheral surface of the metal ring 33.

In FIG. 4, the amplitude σai of the stress on the inner peripheral surface of the metal ring 33 is defined as one half of a difference between the largest tensile stress and the largest compression stress. A middle value σmi of the stress on the inner peripheral surface of the metal ring 33 is defined by a stress at the center of the amplitude σai of the stress. Likewise, in FIG. 5, the amplitude σao of the stress on the outer peripheral surface of the metal ring 33 is defined as one half of a difference between the largest tensile stress and the largest compression stress. A middle value σmo of the stress on the outer peripheral surface of the metal ring 33 is defined by a stress at the center of the amplitude σao of the stress.

Figure 7:
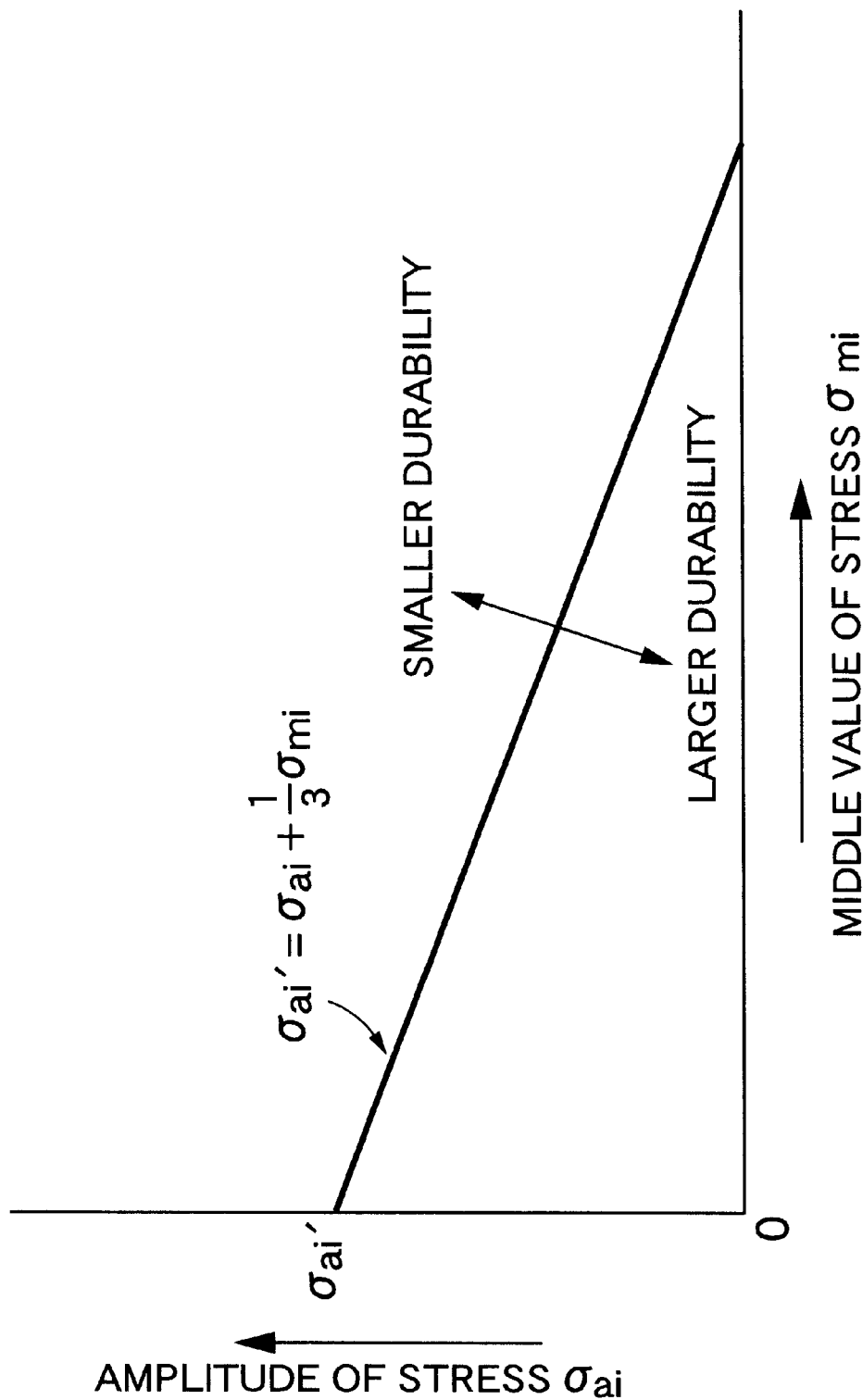
FIG. 7 is a graph used for determining corrected stress amplitudes.

FIG. 7 is a graph defined by the middle value σmi of the stress on the inner peripheral surface of the ring on the axis of abscissas and the amplitude of the stress on the inner peripheral surface of the ring on the axis of ordinates. A rightwardly declining line indicates a combination of the middle value σmi of the stress and the amplitude σai of the stress in which the fatigue lives of the metal ring 33 are equalized. When the middle value σmi of the stress is zero, the amplitude σai of the stress is largest, and the amplitude σai of the stress at that time is defined as a corrected stress amplitude σai'. Namely, the corrected stress amplitude σai' is defined by the equation $$\sigma ai' = \sigma ai + (\tfrac{1}{3})\sigma mi$$

using the stress amplitude σai and the middle value σmi of the stress. Likewise, a corrected amplitude σao' of the stress on the outer peripheral surface of the ring is defined by the equation $$\sigma ao' = \sigma ao + (\tfrac{1}{3})\sigma mo$$

using the stress amplitude σao and the middle value σmo of the stress.

The corrected stress amplitudes σai' and σao' calculated as functions of the stress amplitudes σai and σao and the middle stress values σmi and σmo are appropriate parameters representing the fatigue lives of the inner peripheral surface of the outer peripheral surface of the metal ring 33.

Figure 8:
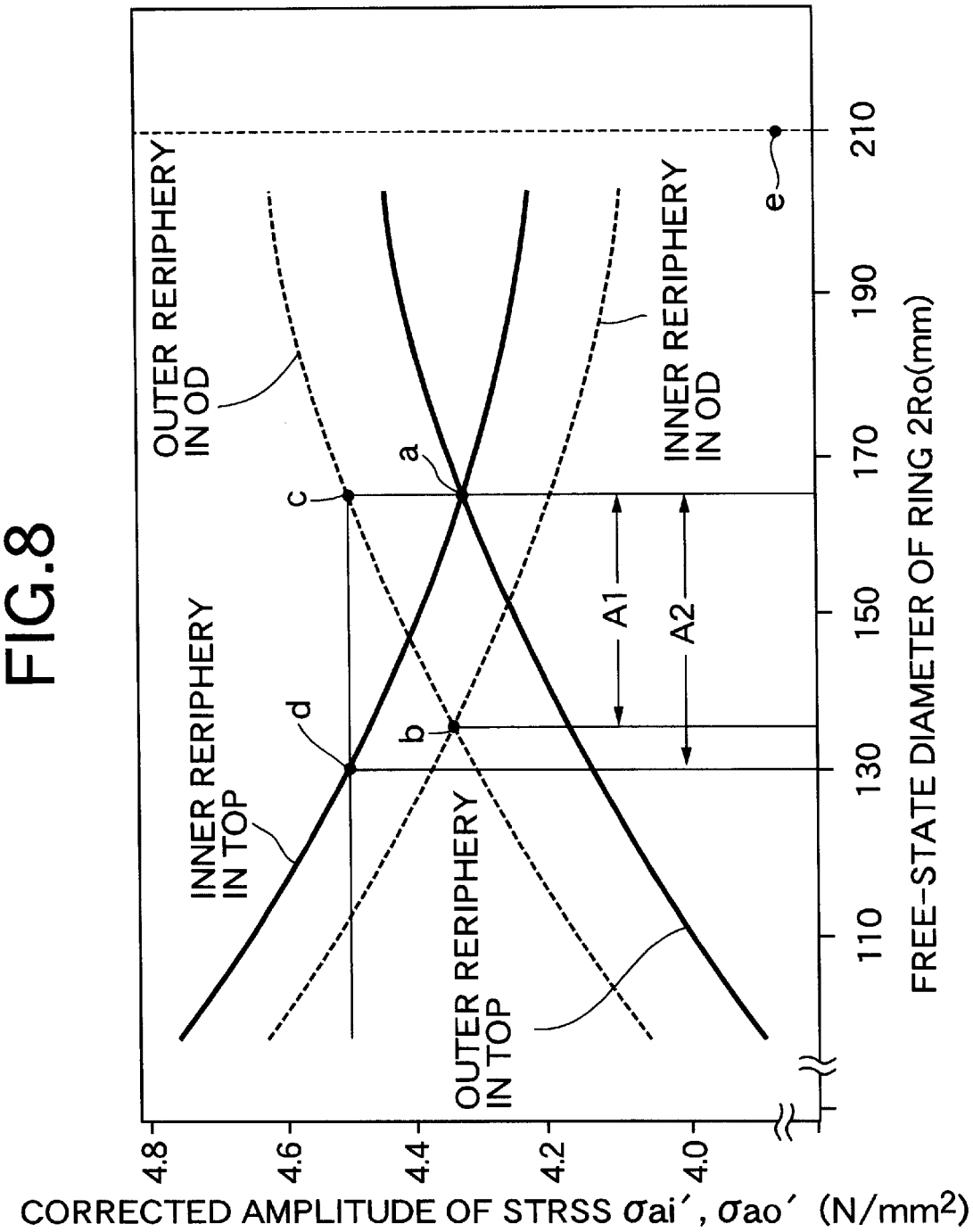
FIG. 8 is a graph used for determining a free-state diameter of the metal ring from the corrected stress amplitudes.

A graph in FIG. 8 shows the characteristics of the variations in the corrected stress amplitudes σai' and σao' in the TOP state, that is, the state of travel at the highest speed, and in the OD state, that is, the state in which the ratio is smallest, when the diameter Ro of the metal ring 33 in a free state has been changed in the metal belt-type continuously variable transmission T in which the axis-axis distance is 155 mm and the inside diameter of the metal ring 33 in an endless or non-cut state is 210 mm. Here, the free state of the metal ring 33 is defined as a state in which a portion of the metal ring has been cut to release the residual stress.

In the TOP state, which is the most severe operational condition for the metal ring 33, when the free-state diameter 2Ro of the metal ring 33 is set at 165 mm, the corrected amplitude σai' of the stress on the inner peripheral surface and the corrected amplitude σao' of the stress on the outer peripheral surface are equal to each other, see point a in FIG. 8. Hence, the fatigue life of the inner and outer peripheral surfaces of the metal ring 33 can be equalized to each other, wherein the fatigue life of the entire metal ring 33 can be prolonged.

If the free-state 2Ro of the metal ring 33 is larger than 165 mm, the corrected amplitude σao' of the stress on the outer peripheral surface is larger than the corrected amplitude σai' of the stress on the inner peripheral surface. If the difference between the corrected amplitude σao' and the corrected amplitude σai' is further increased, the corrected amplitude σao' of the stress on the outer peripheral surface of the metal ring 33 is increased. As a result, there is a possibility that the breaking of the metal ring 33 starts from the outer peripheral surface. On the other hand, if the free-state diameter 2Ro of the metal ring 33 is smaller than 165 mm, the corrected amplitude σai' of the stress on the inner peripheral surface is larger than the corrected amplitude σao' of the stress on the outer peripheral surface. If the difference between the corrected amplitude σao' and the corrected amplitude σai' is further increased, the corrected amplitude σao' of the stress on the inner peripheral surface of the metal ring 33 is increased. As a result, there is a possibility that the breaking of the metal ring 33 starts from the inner peripheral surface.

In the OD state in which the service frequency is higher than that in the TOP state, when the free-state diameter 2Ro of the metal ring 33 is set at 135 mm, the corrected amplitude σai' of the stress on the inner peripheral surface and the corrected amplitude σao' of the stress on the outer peripheral surface are equal to each other, see point b in FIG. 8). Hence, the fatigue life of the inner peripheral surface and the fatigue life of the outer peripheral surface of the metal ring 33 can be equalized to each other, wherein the fatigue life of the entire metal ring 33 can be prolonged.

From the foregoing, it is optimal that the free-state diameter 2Ro of the metal ring 33 is set at 165 mm in correspondence to the OD state, which is the most severe operational state. The free-state diameter 2Ro of the metal ring 33 is set at a value in a range of 135 mm to 165 mm, see region A1 in FIG. 8, to correspond to the OD state, which is the most severe operational state, and the OD state, which is an operational state in which the service frequency is highest.

If the free-state diameter 2Ro of the metal ring 33 is set at 165 mm, which is an optimal value in the TOP state, the corrected amplitude σao', see point c in FIG. 8, of the stress on the outer peripheral surface of the metal ring 33 in the OD state is 4.5 N/mm². The free-state diameter 2Ro at which the corrected amplitude σai' of the stress on the inner peripheral surface, which is equal to the corrected amplitude σao', is generated in the TOP state, is 130 mm, see point d in FIG. 8. Therefore, if the free-state diameter 2Ro of the metal ring 33 is set at a value in a range of 130 mm to 165 mm, see region A2 in FIG. 8, the corrected stress amplitudes σai' and σao can be suppressed to 4.5 N/mm² or less in all the operational states.

As described above, the appropriate range of the free-state diameter Ro is smaller than 210 mm, that is, the line at point e in FIG. 8, which is the inside diameter of the metal ring 33 in the endless or non-cut state, as shown in FIG. 8.

Figure 9:
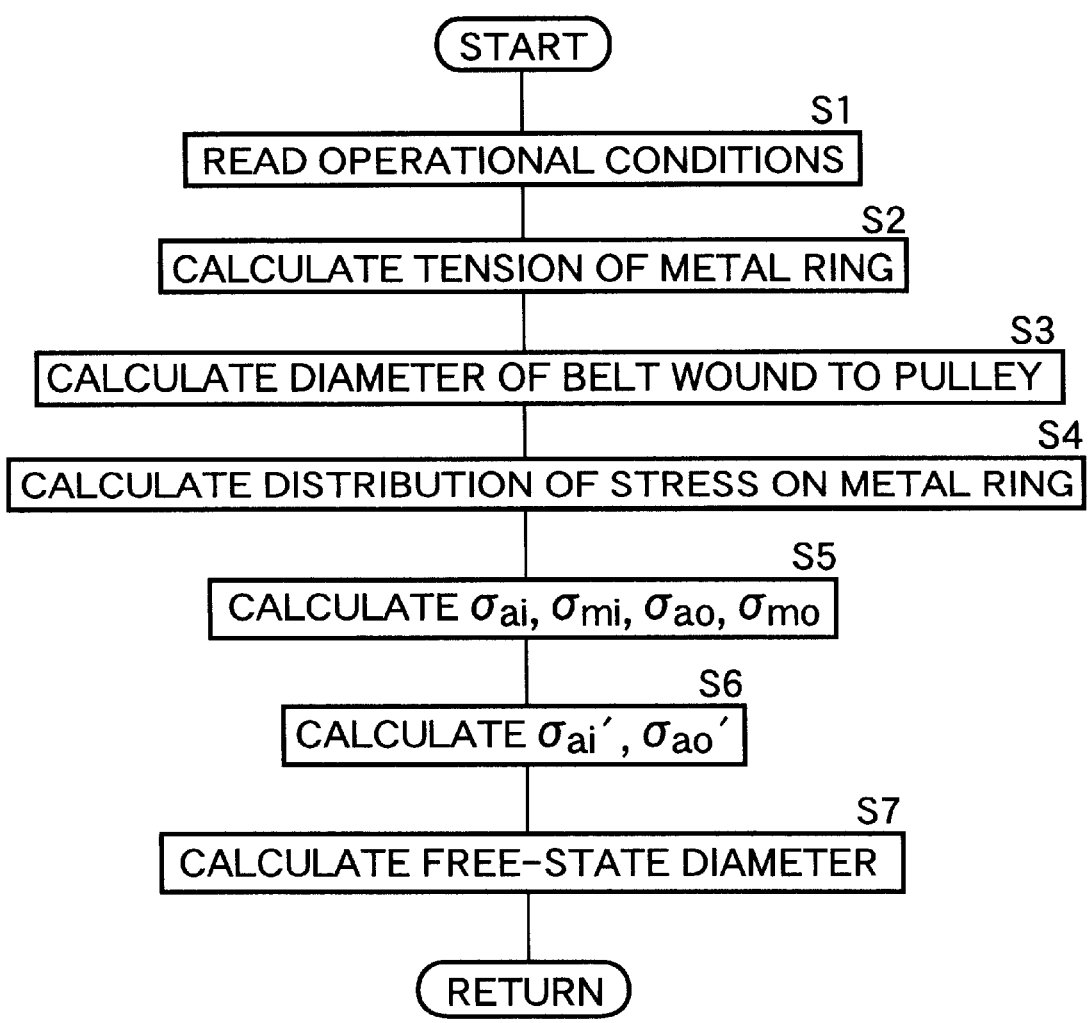
FIG. 9 is a flow chart explaining the steps taken to determine the free-state diameter of the metal ring.

A technique for setting the above-described free-state diameter Ro of the metal ring 33 will be described again with reference to the flow chart shown in FIG. 9.

First, operational conditions for the metal belt-type continuously variable transmission T, i.e., the ratio, the input torque, the input rotational speed and the like are read at Step S1. At step S2, a tension, see the dashed lines in FIGS. 4 and 5, of the metal ring 33 is calculated from a power-transmitting characteristic of the metal belt-type continuously variable transmission T. At Step S3, diameters of metal rings 33 wound on the driving pulley 6 and the driven pulley 11 are calculated. At Step S4, distributions of stresses on the inner and outer peripheral surfaces of the metal ring are calculated, see the solid lines FIGS. 4 and 5, by adding a compression stress and a tensile stress calculated from the diameters of the metal rings 33 wound at a tensile stress based on the tension of the metal ring.

Subsequently, at Step S5, an amplitude σai and a middle value σmi of a stress on the inner peripheral surface of the metal ring 33, and an amplitude σao and a middle value σmo of a stress on the outer peripheral surface of the metal ring 33 are calculated from the graphs shown in FIGS. 4 and 5. Then, a corrected amplitude σai' of the stress on the inner peripheral surface and a corrected amplitude σao', see FIG. 8, of the stress on the outer peripheral surface are calculated from the values σai, σmi, σao and σmo at Step S6. A free-state diameter Ro of the metal rings 33 is calculated at Step S7, based on the corrected stress amplitudes σai' and σao' from the graph shown in FIG. 8.

Now, when the optimal free-state diameter Ro of the metal ring 33, at which the fatigue life of the metal ring 33 can be prolonged, has been determined, a residual stress permitting such free-state diameter Ro to be provided is applied to the metal ring 33, which is in the endless state. To confirm whether a residual stress equal to a preset value has been applied to the metal ring 33 in the endless state, it is required that a portion of the metal ring 33 is cut to bring the metal ring 33 into a free state, and a free-state diameter Ro is measured in this state.

If the residual stress on the metal ring 33 in the endless state is a compression stress on the outer peripheral surface and a tensile stress on the inner peripheral surface when the metal ring 33 in the endless state shown in FIG. 10A has been cut at one point A, the residual stress is released, as shown in FIG. 10B. Accordingly, the metal ring 33 is deformed so that it is closed and one of the cut ends 33a of the metal ring 33 interferes with an intermediate portion, wherein an accurate free state is not achieved. Therefore, the free-state diameter Ro cannot be measured.

In the present invention, when the residual stress is released, as shown in FIG. 10C, to cause the metal ring 33 to be deformed so that it is closed, by cutting the metal ring 33 in the endless state, as shown in FIG. 10A, at two points: points A and B, a pair of cut ends 33a and 33b of the metal ring 33 do not interfere. In this manner, an accurate free-state diameter Ro can be measured.

The number of the points, at which the metal ring 33 in the endless state is cut, is not to two and may be three or more. In other words, if the interference occurs when the metal ring 33 in the endless state has been first cut at two points, the metal ring may be cut many times until the interference does not occur.

Although the present invention has been described in detail with regard to a preferred embodiment, it will be understood that the present invention is not limited to the above-described embodiment, and various modifications in design may be made without departing from the spirit and scope of the invention defined in the claims.

What is claimed is:

1. A method for setting a free-state diameter of each metal ring of a metal belt for a continuously variable transmission upon cutting of said metal ring at a predetermined value based on a residual stress in order to apply said residual stress to said metal ring, the method comprising the steps of:
    calculating variations in a stress on an inner peripheral surface of said metal ring and variations in a stress on an outer peripheral surface of said metal ring during operation of the continuously variable transmission;
    calculating an amplitude and a middle value of the stress on the outer peripheral surface of said metal ring;
    calculating a corrected amplitude of the stress on the outer peripheral surface from said amplitude and said middle value of the stress on the outer peripheral surface;
    calculating an amplitude and a middle value of the stress on the inner peripheral surface of said metal ring;
    calculating a corrected amplitude of the stress on the inner peripheral surface from said amplitude and said middle value of the stress on the inner peripheral surface; and
    setting a free-state diameter based on said corrected amplitude of the stress on the outer peripheral surface and said corrected amplitude of the stress on the inner peripheral surface.

2. The method according to claim 1, wherein the free-state diameter is set so the corrected amplitude of the stress on the outer peripheral surface of the metal ring and the corrected amplitude of the stress on the inner peripheral surface are equal.

3. The method according to claim 2, wherein the free-state diameter is set based on the corrected amplitude of the stress on the outer peripheral surface of said metal ring and the corrected amplitude of the stress on the inner peripheral surface in a TOP-ratio state of the continuously variable transmission.

4. The method according to claim 3, wherein a region between the free-state diameter at which the corrected amplitudes of the stresses on the outer and inner peripheral surfaces of said metal ring in the TOP-ratio state of the continuously variable transmission are equal and the free-state diameter at which the corrected amplitudes of the stresses on the outer and inner peripheral surfaces of said metal ring in an OD-ratio state of the continuously variable transmission are equal, is established as a region where the free-state diameter is appropriate.

5. The method according to claim 1, wherein the free-state diameter is set based on the corrected amplitude of the stress on the outer peripheral surface of said metal ring and the corrected amplitude of the stress on the inner peripheral surface in a TOP-ratio state of the continuously variable transmission.

6. The method according to claim 5, wherein a region between the free-state diameter at which the corrected amplitudes of the stresses on the outer and inner peripheral surfaces of said metal ring in the TOP-ratio state of the continuously variable transmission are equal and the free-state diameter at which the corrected amplitudes of the stresses on the outer and inner peripheral surfaces of said metal ring in an OD-ratio state of the continuously variable transmission are equal, is established as a region where the free-state diameter is appropriate.

7. The method according to claim 1, wherein a region between the free-state diameter at which the corrected amplitudes of the stresses on the outer and inner peripheral surfaces of said metal ring in a TOP-ratio state of the continuously variable transmission are equal and the free-state diameter at which the corrected amplitude of the stress on the inner peripheral surface of said metal ring equal to the corrected amplitude of the stress on the outer peripheral surface of said metal ring in a state in which a ratio of the continuously variable transmission at said free-state diameter assumes a value in the OD-ratio state is generated in the TOP-ratio state of the continuously variable transmission, is established as a region where the free-state diameter is appropriate.

8. The method according to claim 1, wherein a region between the free-state diameter at which the corrected amplitudes of the stresses on the outer and inner peripheral surfaces of said metal ring in the TOP-ratio state of the continuously variable transmission are equal and the free-state diameter at which the corrected amplitudes of the stresses on the outer and inner peripheral surfaces of said metal ring in an OD-ratio state of the continuously variable transmission are equal, is established as a region where the free-state diameter is appropriate.

* * * * *